(12) United States Patent
Garcia

(10) Patent No.: US 8,874,276 B2
(45) Date of Patent: Oct. 28, 2014

(54) EVENT-BASED CONTROL SYSTEM FOR WIND TURBINE GENERATORS

(75) Inventor: Jorge Martinez Garcia, Saragossa (ES)

(73) Assignee: Vestas Wind Systems A/S, Aarhus N (DK)

( * ) Notice: Subject to any disclaimer, the term of this patent is extended or adjusted under 35 U.S.C. 154(b) by 420 days.

(21) Appl. No.: 12/808,755

(22) PCT Filed: Dec. 19, 2008

(86) PCT No.: PCT/DK2008/050326
§ 371 (c)(1),
(2), (4) Date: Sep. 22, 2010

(87) PCT Pub. No.: WO2009/076968
PCT Pub. Date: Jun. 25, 2009

(65) Prior Publication Data
US 2011/0004356 A1 Jan. 6, 2011

Related U.S. Application Data

(60) Provisional application No. 61/008,608, filed on Dec. 19, 2007.

(30) Foreign Application Priority Data

Dec. 19, 2007 (DK) .................................. 2007 01827

(51) Int. Cl.
| | | |
|---|---|---|
| G05D 3/12 | (2006.01) | |
| G05B 13/02 | (2006.01) | |
| F03D 9/00 | (2006.01) | |
| G06F 15/18 | (2006.01) | |
| G06F 17/00 | (2006.01) | |

(52) U.S. Cl.
USPC ............. 700/287; 700/48; 700/286; 700/291; 290/44; 706/1; 706/12; 706/45

(58) Field of Classification Search
CPC .............................. F01K 25/06; Y02E 10/722
USPC ........ 700/287, 289, 291, 295, 48–50; 290/44; 705/2.37; 706/1, 12, 13, 45, 62
See application file for complete search history.

(56) References Cited

U.S. PATENT DOCUMENTS 7,531,911 B2 *   5/2009   Rivas et al. ..................... 290/44
7,627,454 B2 *  12/2009   LaComb et al. .............. 702/182

(Continued)

FOREIGN PATENT DOCUMENTS

| EP | 1531376 A1 | 5/2005 |
| GB | 2405492 A | 3/2005 |

(Continued)

OTHER PUBLICATIONS

Zhang et al. (Fuzzy Control of Variable Speed Wind Turbine, 2006).*

(Continued)

*Primary Examiner* — Darrin Dunn
(74) *Attorney, Agent, or Firm* — Patterson & Sheridan, LLP

(57) ABSTRACT

The present invention relates to a control system comprising a control interface between one or more wind turbine generators and a power grid, where the wind turbine generators are coupled to the power grid and contribute to the power production of the grid. The control interface is arranged to receive a set of event data. In embodiments, the set of event data may be any data available to a SCADA system. The set of event data is analyzed in terms of predetermined event rules comprising at least one predefined event condition and a set of adaptive event conditions. Based on the analysis an event output is provided in order to control a parameter of the one or more wind turbine generators. In embodiments, the control system may be implemented in, or in connection with a SCADA system, moreover, the event output may be based on fuzzy logic, a neural network or statistical analysis.

20 Claims, 3 Drawing Sheets

(56) References Cited

U.S. PATENT DOCUMENTS

| | | | |
|---|---|---|---|
| 7,729,810 B2* | 6/2010 | Bell et al. | 700/295 |
| 2002/0029097 A1* | 3/2002 | Pionzio et al. | 700/286 |
| 2002/0107615 A1* | 8/2002 | Bjorklund | 700/286 |
| 2002/0194113 A1* | 12/2002 | Lof et al. | 705/37 |
| 2004/0167659 A1* | 8/2004 | Scherer | 700/173 |
| 2004/0207207 A1 | 10/2004 | Stahlkopf | |
| 2004/0230377 A1 | 11/2004 | Ghosh et al. | |
| 2005/0090937 A1* | 4/2005 | Moore et al. | 700/286 |
| 2005/0160128 A1* | 7/2005 | Fardanesh | 708/446 |
| 2005/0203671 A1* | 9/2005 | Mertins et al. | 700/291 |
| 2007/0001461 A1 | 1/2007 | Hopewell | |
| 2008/0010966 A1* | 1/2008 | Taware et al. | 60/39.27 |
| 2008/0071465 A1* | 3/2008 | Chapman et al. | 701/117 |
| 2008/0086281 A1* | 4/2008 | Santos | 702/127 |
| 2010/0274573 A1* | 10/2010 | Feied et al. | 705/2 |
| 2011/0060827 A1* | 3/2011 | Corley et al. | 709/224 |

FOREIGN PATENT DOCUMENTS

| | | |
|---|---|---|
| WO | 0205041 A2 | 1/2002 |
| WO | 02099544 A1 | 12/2002 |

OTHER PUBLICATIONS

Cox (Adaptive Fuzzy Systems, IEEE, 1993).*
Calderaro et al. "A fuzzy controller for maximum energy extraction from variable speed wind power generation systems", Electric Power Systems Research 78 (2008) 1109-1118.
Denmark Patent Office, translation of Examination Report issued in related application serial No. PA 2007 01827 dated Jun. 26, 2008.
European Patent Office, International Search Report issued in related International Application No. PCT/DK2008/050326 dated Mar. 4, 2010.
European Examination Report for corresponding EP Application No. 08 860 872.4, Jun. 20, 2014.

* cited by examiner

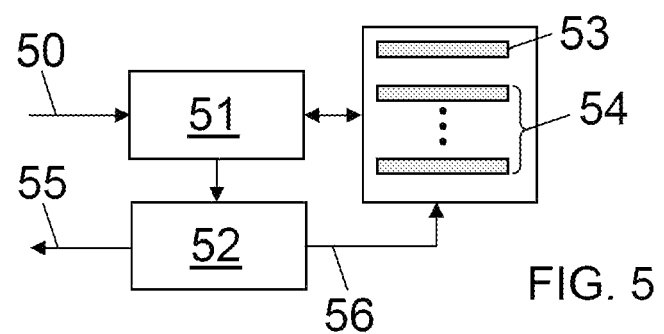

EVENT-BASED CONTROL SYSTEM FOR WIND TURBINE GENERATORS

FIELD OF THE INVENTION

The present invention relates to a control system comprising a control interface between one or more wind turbine generators and a power grid, where the wind turbine generators are coupled to the power grid and contribute to the power production of the grid. In particular, the present invention relates to a control system controlling a parameter of the one or more wind turbine generators, to a method of controlling a power output from the one or more wind turbine generators, to a SCADA system and to a computer program product.

BACKGROUND OF THE INVENTION

A large-scale power grid may be supplied from a number of different power source types. Typically the main power source is a type of thermal power generator, such as steam turbines based on coal, fossil fuel or nuclear fuel. Increasingly, however, wind power generators contribute to the overall power production in large-scale power grids. For operators of the power grids it is paramount to ensure stable and controllable power production of their power grids. Since wind turbine generators are relatively unstable power sources that fluctuate with wind conditions, wind turbine generators must be properly interfaced to the power grid to avoid carrying over instabilities into the grid since such instabilities can create disturbances that propagate trough the power grid system. To this end, the variability of wind creates a challenge to the integration of high levels of wind generated power into power grids.

In connection with controlling and monitoring wind generator turbines a Supervisory Control And Data Acquisition (SCADA) system is typically applied. A SCADA system may also be referred to as a Supervisory Command And Data Acquisition system. A SCADA system is on one hand configured to collect a large number of data from the wind turbine generators to which it is connected, and on the other hand configured to control the wind turbine generators to which it is connected by means of control routines feeding control parameters and settings to the wind turbine generators, so that a stable an controlled power supply can be ensured.

Solutions of the prior art relating to ensuring a stable and controllable power generation from a wind turbine generators include using meteorological modelling to predict changes in power production from wind turbine generators. In the published US patent application 2004/0207207 a power control interface is disclosed. A control system is disclosed that uses data derived from monitoring the power output form wind turbines generators of a wind farm and the power transmission line. Based on system-modelling algorithms the power output is predicted, and the power generation is stabilized by storing or releasing generated power in unstable periods. The system-modelling algorithms are based on meteorological predictions. Model-based solution, however, suffer from the fact that the combined system of external influences, e.g. meteorologically based, and internal influences, e.g. electrically based, is extremely complex and difficult, if not impossible, to model precisely.

The inventor of the present invention has appreciated that improved control of the power output from one or more wind turbine generators is of benefit, and has in consequence devised the present invention.

SUMMARY OF THE INVENTION

The present invention seeks to provide an improved way of handling parameters used in the control of one or more wind turbine generators. In particular, it may be seen as an object of the present invention to provide a means for improving the behaviour of a control system, and thereby the output from the one or more wind turbine generators. Preferably, the invention alleviates, mitigates or eliminates one or more problems of the prior art.

According to a first aspect of the invention there is provided a control system comprising a control interface between a power output from one or more wind turbine generators and a power grid, the control interface comprising:
an input unit for receiving:
a set of event data, the set of event data comprises a one or more parameters of the one or more wind turbine generators;
an event analyzer for providing:
an event analysis of the set of event data, the event analysis being based on at least one predetermined event rule comprising at least one predefined event condition and a set of adaptive event conditions; and
an event output based on the event analysis; and
a control unit for controlling at least one parameter of the event data in accordance with the event output.

The inventor of the present invention has realized that, by inputting into a control system a set of event data and analyzing these data in accordance with conditional rules, the control of parameters, and thereby the control of a wind turbine, can be optimized, or at least improved.

The event data is analysed in accordance with at least one predetermined rule. The predetermined rule is typically set by a user or a designer of the system. The rule is formulated in terms of conditions to be fulfilled. It is an advantage of the present invention, that the rules and the event data need not be coupled together in a modelling of the system. This is an advantage, since modelling a power generator-grid system, taking into account all the factors which can influence wind power generation, e.g. meteorological aspects, and grid behaviour, e.g. transient phenomenon, is an extremely complex matter, which may be impossible to solve.

In embodiments, a number of predefined rules may be used, such as more than 3 rules, more than 5 rules, more than 10 rules, more than 25 rules, more than 50 rules, more than 100 rules or even several hundred rules.

In embodiments, the set of event data comprises a number of different parameters, such as more than 3 parameters, more than 5 parameters, more than 10 parameter more than 25 parameters, more than 50 parameters, more than 100 parameters or even several hundred parameters.

The event analyzer provides an event analysis of the set of event data in terms of at least one predefined event condition and a set of adaptive event conditions. The predetermined event condition reflects a known condition, whereas the adaptive event conditions reflect conditions in terms of values of the event data, these data values are not necessarily known, and moreover the adaptive conditions may be refined (adapted) during operation of the control interface. In this way, an event may be defined both by known predefined conditions and conditions that are adapted during operation. This is an advantage, since no knowledge of the specific values of the adaptive conditions is needed before operation.

The control interface controls at least one parameter of the event data. The parameter may be a parameter indicative of a physical parameter of the one or more wind turbine generators or other components in the wind farm related to the power produced by the wind turbine generators. The parameter may be referred to as a system parameter. Typical parameters comprise, but are not limited to, a parameter selected for a group of the following parameters: output voltage per phase, output current per phase, phase angle between grid voltage and current, phase angle displacement between individual phases and grid frequency, etc.

In advantageous embodiments, the control interface is communicatively connected to a SCADA system or is at least partly implemented into a SCADA system. All relevant event data is typically available to the SCADA system, moreover a SCADA system is typically used in connection with controlling parameters of one or more wind turbine generators. Embodiments of the present invention may thereby be integrated into and thereby update existing systems, as well as new systems may be provided which does not require major redesign of the SCADA system.

In an advantageous embodiment, the predefined event condition is based on a predefined change of a parameter value of a selected parameter of the event data. The selected parameter may be the parameter to be controlled by the control system. The selected parameter as well as the magnitude of the predefined change may be selected or set by a user or a designer of the system.

In an advantageous embodiment, the adaptive event conditions are based on a set of parameter values of a selected set of parameters of the event data. The set of parameters of the event data may be selected or set by a user or a designer of the system.

The event analyzer analyses the set of event data. In an embodiment, the analysis may be a two-stage process. In a first stage the event data is monitored in accordance with the conditions set up by the at least one predetermined event rule, and in a second stage a substantial event analysis is initiated when the values of the set of event data fulfils the set of adaptive event conditions. By initiating the event analysis based on the adaptive event conditions, it may be ensured that the event analysis and thereby the controlling of the parameter is done independently of the predetermined event conditions. For example in a situation where the event data indicate a given event as defined by the predefined event condition prior to the occurrence of the event itself, the control interface may ensure that the system is ready for the event. That is, the control interface may predict the occurrence of an event, or at least provide a probability of the occurrence of an event. To this end, the control interface may be referred to as a predictive control interface or predictive event controller.

In exemplary embodiments, each event condition in the set of adaptive event conditions comprises an adaptive evaluation weight. The evaluation weight may reflect the relevance of the corresponding adaptive event condition, such that a low weight reflects a condition of low importance, whereas a high weight reflects a condition of high importance. In embodiment, more than one evaluation weight may be associated to each or some of the adaptive event conditions.

In exemplary embodiments, when the at least one predefined event condition is met, the set of adaptive event conditions are modified in accordance with a modification algorithm. Different types of modification algorithms may be used. The modification may be done by modifying the evaluation weights.

In exemplary embodiments, the event output of the event analysis may be based on, and even combine, different types of analysis. The event output may be based on at least one, but typically a number of, fuzzy rules, the event output may be based on a neural network, and/or the event output may be based on statistical analysis. Fuzzy logic and neural network are very strong tools to predict events based on conditional data. However, with fuzzy logic and neural networks it may be difficult to understand the underlying basis of a decision. At least for some systems it may therefore be desirable to base the event analysis on a statistical analysis.

In exemplary embodiments, the controlling of the at least one parameter of the event data may be based on setting a tuning parameter of a P controller, PI controller or a PID controller. P, PI and PID controllers are extremely versatile and widely used controllers. It is an advantage of such a controller that they are very simple to implement. It is, however, a problem of such controllers that they are prone to instabilities when set points or target values changes. In an advantageous embodiment of the present invention, the result of the event analysis is to determine or set tuning parameters used in a P, PI or PID controller.

In accordance with a second aspect of the present invention, there is provided a method of controlling a power output from one or more wind turbine generators to a power grid, the method comprising:
receiving a set of event data, the set of event data comprises one or more parameters of the one or more wind turbine generators;
analysing the set of event data for providing
    an event analysis, the event analysis being based on at least one predetermined event rule comprising at least one predefined event condition and a set of adaptive event conditions; and
    an event output based on the event analysis; and
controlling at least one parameter of the event data in accordance with the event output.

In a third and fourth aspect of the present invention, the method in accordance with the second aspect are implemented into a SCADA system and into a computer program product having a set of instructions, when in use on a computer, to cause the computer to perform the method of the second aspect.

The computer program product may used in connection with a programmable SCADA system.

In general, the individual aspects of the present invention may each be combined with any of the other aspects. These and other aspects of the invention will be apparent from the following description with reference to the described embodiments.

BRIEF DESCRIPTION OF THE FIGURES

Embodiments of the invention will be described, by way of example only, with reference to the drawings, in which FIG. 1 schematically illustrates elements of a control system comprising a control interface between a power output from one or more wind turbine generators and a power grid;

FIG. 5 illustrates a flow diagram of embodiments in accordance with the present invention.

DESCRIPTION OF EMBODIMENTS

Embodiments of the control system in accordance with the present invention are described in the following. In the described embodiments, the control system is implemented in connection with a Supervisory Control And Data Acquisition (SCADA) system. However, it is to be understood, that the control system is not limited to a SCADA system implementation, but may be implemented in connection with any type of control system between a power output from one or more wind turbine generators and a power grid.

Figure 1:
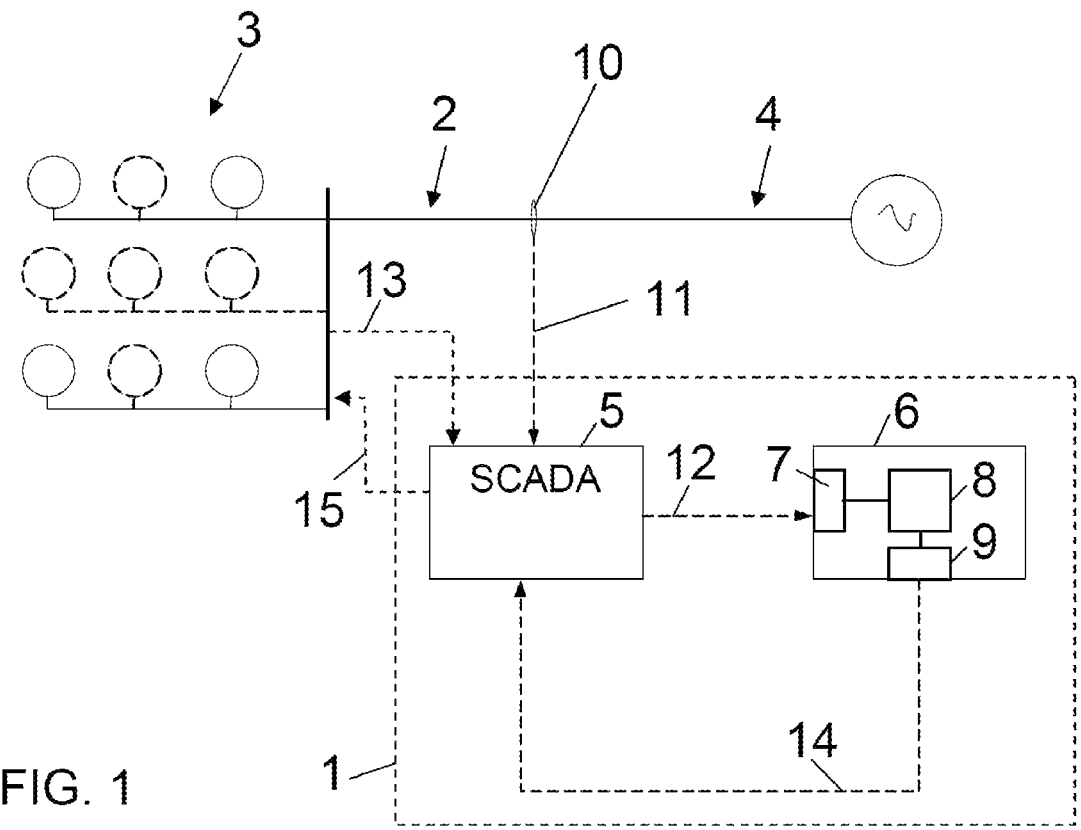

FIG. 1 schematically illustrates elements of an embodiment of the present invention. The Figure schematically illustrates a control interface 1 between a power output 2 from one or more wind turbine generators 3 and a power grid 4. The one or more wind turbine generators 3 may be in the form of a wind farm comprising a number of turbines. The power grid 4 may be any type of grid, such as a typical large-scale grid for distributing electricity to residential areas, industrial areas, etc.

The control interface is schematically illustrated by a SCADA system 5 and an event controller 6. This is for illustrative reasons since an entire SCADA system does not necessarily form part of the interface. Instead, in embodiments, the SCADA system may be communicatively connected to the control interface or the control interface may be at least partly implemented into a SCADA system. Thus, in embodiments, the control interface in accordance with the present invention may be implemented into a single module or element, or it may be implemented or distributed into a number of elements. The implementation may be purely software-based, purely hardware-base, or a combined software-hardware solution. In the illustrated embodiment, the event controller 6 implements the add-on functionality of the SCADA system in order to arrive at a control interface in accordance with embodiments of the present invention.

The control interface 1 comprises an input unit 7 for receiving a set of event data. The input unit is illustrated as an input element of the event controller 6. In general, the input may be any means of receiving data or signals representing the event data. The event data is inputted into an event analyzer 8 for analysing the event data, and for providing an event output based on the event analysis. The event output is inputted into a control unit 9 for controlling the parameter in accordance with the event output. The event data may be received 12 or accessed from the SCADA system. The event output is inputted 14 into the SCADA system, which outputs a control signal 15 in accordance with the event output. The control signal 15 is provided to the wind turbine generators, e.g. by providing the control signal to the individual controllers of the wind turbine generators, and/or other components in the wind farm, e.g. compensation equipment (such as cap banks, Statcom, SVC, etc.), by providing the control signal to a central control unit which controls the individual wind turbine generators.

In an embodiment, the control interface controls at least one parameter of the event data, in terms of a stabilization of the parameter. The parameter may be any parameter controlled or monitored by the SCADA system. Typical parameters controlled by a SCADA system include, but are not limited to the following parameters: output voltage per phase, output current per phase, phase angle between grid voltage and current, phase angle displacement between individual phases and grid frequency, etc. The parameter is typically measured at an output location 10 and inputted 11 into the SCADA system.

The one or more parameters form part of a data set referred to as the set of event data. The set of event data, may comprise a large number of data, including but not limited to data in the group of: data indicative of the current provided to the power grid, data indicative of the voltage provided to the power grid, a parameter indicative of the wind speed present at the one or more wind turbine generators, time data, data indicative of the active power, data indicative of the reactive power, data indicative of the total power, meteorological data, data indicative of the reactive power, data indicative of the grid frequency, data indicative of a phase, number of active wind turbine generators, data indicative on the status on the electrical grid, target level of a parameter, control data from one or more Supervisory Control And Data Acquisition (SCADA) systems, e.g. positioned at different geographical locations.

In general, the event data may comprise any data available from the SCADA system, and the event controller may be arranged to receive at least part of, and typically the entire, set of event data from the SCADA system. The SCADA system may receive the data from the output location 10 and from the wind farm 13, etc.

In a known SCADA system, a number of PI-controllers are used to stabilize a number of parameters of the one or more wind turbines, and thereby the output from the wind turbines. The PI-controller may e.g. control the reactive power Q. The controller monitors the measured reactive power $Q_{meas}$ and compares it to a set point or target value of the reactive power $Q^*$. Based on the comparison an output $Q_{out}$ is determined. As is known in the art, the PI controller operates by applying a set of tuning parameters. In embodiments, also P-controllers or PID-controllers may be applied. As is known in the art the stability of P, PI and PID controllers are highly dependent upon the tuning parameter used in the control loop. Moreover, tuning parameters which are stable for a given set point, is not necessarily stable for another set point. For example, if for one or another reason the voltage of the grid fall abruptly or the short circuit impedance of the grid change to a very different value, the controller tuning parameters may not be optimized for this new environmental conditions, and the output is prone to instabilities or overshooting if the tuning parameters are not adapted.

Relevant tuning parameters for relevant set point may be known in advance, such tuning parameters may be stored in a suitable way, such as by use of a table. The problem is not to shift the tuning parameters, but to know when to apply the relevant tuning parameters.

Embodiments of the present invention provide a solution to this problem.

The event controller monitors the set of event data in terms of a rule-based analysis. In embodiments, the rule-based analysis does not imply any modelling of the operation of the grid or the wind farm, etc.

The rules are based on at least one predefined event condition and a set of adaptive event conditions.

The predefined event conditions are set up by a user or designer of the control interface. Examples of predefined event conditions include but are not limited to conditions of a change in a parameter value. For example, a predefined event condition could be a drop in measured output voltage in the range of 5% to 15%. In general embodiments, a drop or an increase in any parameter which is controlled by the SCADA system may be set as a predefined event condition. The set of adaptive event conditions are in embodiments the measured parameter values of the event data associated to the predefined event condition. An example is provided in FIG. 2.

Typically, a user or a designer of the system decides which data to be used as the event data. In principle all event data available to the control interface may be used, however a subset may also be selected.

Figure 2:
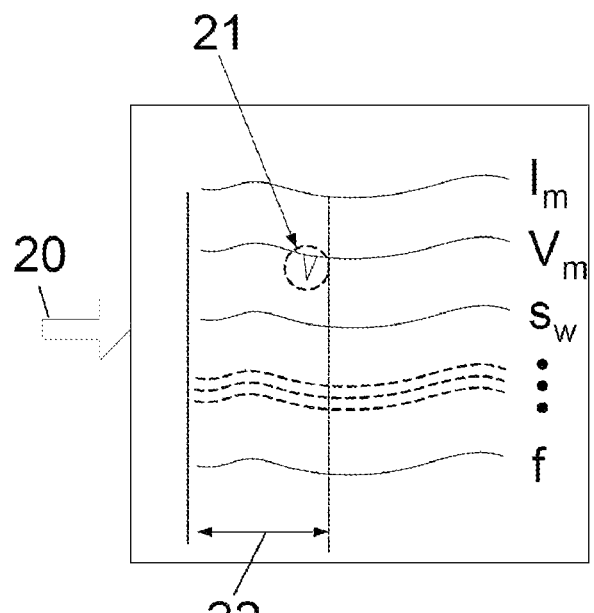
FIG. 2 illustrates an example of a set of event data which are inputted into or monitored by an event controller.

In FIG. 2 a set of event data 20 are inputted into or monitored by the event controller. In the embodiment of FIG. 2, the set of event data comprise the measured current $I_m$, the measured voltage $V_m$, the wind speed measured at specific locations in the wind farm $s_w$, the time data t, the active power P, the reactive power Q and the grid frequency f.

As an example a predefined event rule may be defined as The Predefined Event:

drop in $V_m$ between 5% and 15%

Adaptive event conditions as being the values of the event data when the predefined event condition is fulfilled, for example denoted $t_{fulfil}$, e.g:

Adaptive Event Conditions:

$$A1 = I_m(t = t_{fulfil})$$

$$A2 = v_s(t = t_{fulfil})$$

$$A3 = t(t = t_{fulfil})$$

$$A4 = P(t = t_{fulfil})$$

$$A5 = Q(t = t_{fulfil})$$

$$A6 = f(t = t_{fulfil})$$

Generally, however the set of adaptive event conditions are based on values of the set of event data in a time period 22 up to the point in time when the predefined event condition is met. For example, the specific adaptive event conditions may be mean values of the values measured in the time period up to the fulfilling of the predefined event condition. The time period may be different for different data. For example the time period of such data as: current, voltage, power and frequency may not need to be too long, e.g. some seconds, whereas the time period of such data as the wind speed may need to be longer, such a 30 minutes or few hours. Naturally, the mean value is not taken for data such as time data, e.g. time, day of week, month etc.

The predefined event condition is illustrated in FIG. 2 by a drop 21 in the measure voltage.

The first time the predefined event condition is met, the adaptive event conditions are set. In an embodiment, each event condition in the set of adaptive event conditions comprises an adaptive evaluation weight. The first time the predefined event condition the evaluation weight may be set to 1 (100%).

In an embodiment, the set of adaptive event conditions are adaptively modified each time the predefined event condition is met.

The next time the predefined event condition is met, the adaptive event conditions are modified. In an embodiment, a comparison is made between the stored adaptive event conditions and the newly obtained or measured adaptive event conditions.

For example, each time the predefined event condition: drop in $V_m$ between 5% and 15%, is met, the adaptive evaluation weights are modified:

The Predefined Event:

drop in $V_m$ between 5% and 15%

Adaptive Event Conditions:

| A1 | $I_m(1) = 20$ A | $w_1 = 1$ | $I_m(2) = 19$ A | $w_2 = 0.99$ |
|----|----|----|----|----|
| A2 | $v_s(1) = 4$ m/s | $w_1 = 1$ | $v_s(2) = 1$ m/s | $w_2 = 0.5$ |
| A3 | $t(1) = 7:50$ am | $w_1 = 1$ | $t(2) = 7:50$ am | $w_2 = 1$ |
| A4 | $P(1) = 2500$ W | $w_1 = 1$ | $P(2) = 2400$ W | $w_2 = 0.99$ |
| A5 | $Q(1) = 1000$ Var | $w_1 = 1$ | $Q(2) = 1100$ Var | $w_2 = 0.99$ |
| A6 | $f(1) = 50$ Hz | $w_1 = 1$ | $f(2) = 50$ Hz | $w_2 = 1$ |

| A1 | $I_m(3) = 21$ A | $w_3 = 0.98$ | $I_m(n) = 19$ A | $w_n = 0.99$ |
|----|----|----|----|----|
| A2 | $v_s(3) = 9$ m/s | $w_3 = 0.25$ | $v_s(n) = 1$ m/s | $w_n = 0.01$ |
| A3 | $t(3) = 7:51$ am | $w_3 = 0.99$ | $t(n) = 7:50$ am | $w_n = 0.99$ |
| A4 | $P(3) = 2000$ W | $w_3 = 0.6$ | $P(n) = 2400$ W | $w_n = 0.01$ |
| A5 | $Q(3) = 600$ Var | $w_3 = 0.6$ | $Q(n) = 1100$ Var | $w_n = 0.01$ |
| A6 | $f(3) = 50$ Hz | $w_3 = 1$ | $f(n) = 50$ Hz | $w_n = 1$ |

After n events a rule may be: when $I_m = 20$ A, the time is 7:50 and the frequency is 50 Hz, there is a large probability that the voltage will drop in the range of 5% to 15%.

In an embodiment, the rule may after n events be: when $I_m$ is in the range of 19 A to 21 A, the time is between 7:45 and 7:55 and the frequency is 50 Hz, there is a large probability that the voltage will drop in the range of 5% to 15%.

In an embodiment, criteria may be set as to the number of events, n, when a rule is applied in the event analysis. Alternatively, criteria may set as to the stability of the weights between successive events. Other criteria may also be set.

The event analyzer analyzes the event data, and when the values of the set of event data fulfils the set of adaptive event conditions, the event analysis is initiated in order to provide an event output. In the embodiment where a parameter is controlled by a PI controller, the event output may be to set the PI tuning parameters in accordance with the voltage drop, thereby avoiding instabilities in the output voltage, or at least diminish such instabilities.

Thus, it may be known which tuning parameters to use in connection with a voltage drop between 5% and 15%. However, these tuning parameters may not be the same as tuning parameters to be used in connection with a voltage drop between 20% and 25%.

From the event rule, it may be possible prior to the event even occurs to determine or predict that a given event is about to occur, as well as to distinguish between different events with overlapping predefined event conditions.

For example by applying the above-mentioned rule: when $I_m = 20$ A, the time is 7:50 and the frequency is 50 Hz, set the P and I tuning parameter to values which are optimized for the voltage in the range of 85% to 95% of the target voltage and maintain these tuning parameter for 15 minutes.

The modification of the adaptive event conditions, e.g. in the form of adapting the adaptive evaluation weighs may be done in accordance with a modification algorithm.

Different types of modification algorithm may be utilized, for example the modification algorithm may be based on fuzzy logic, on a neural network, on a statistical analysis, or other means.

Figure 3:
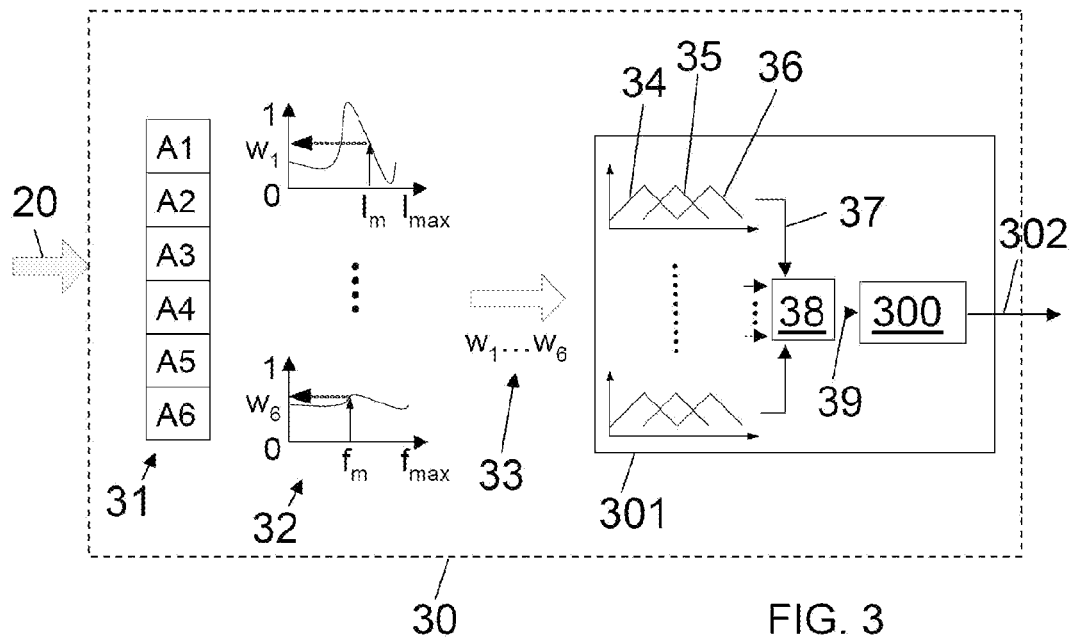
FIG. 3 illustrates a diagram of an exemplary embodiment where fuzzy logic is applied.

FIG. 3 illustrates a diagram of an exemplary embodiment of an event analyzer applying fuzzy logic in order to provide an event output.

A set of event data 20 is inputted into the event analyzer 30, and as in connection with FIG. 2, the event data having assigned six adaptive event conditions (A1 to A6, 31).

The set of event data may be analyzed by statistically evaluating the measured values ($I_m \ldots f_m$, 32) to obtain statistical weights ($w_1 \ldots w_6$, 33), e.g. by means of correlation curves. Correlation curves are schematically indicated in FIG. 3 by the curves pointed to by reference numeral 32. In a correlation curve statistical weights may be obtained from a function correlating a measured value to a probability that the measured value is indicative of the event. Thus, for the event defined above ($V_m$ drop between 5% and 15%), the $w_1$ represents the probability, based on prior events, that the measured value of $I_m$ is indicative of the event, and like-wise for the weights $w_2$ to $w_6$.

The weights ($w_1 \ldots w_6$, 33) are inputted into a fuzzy analyzer 301, e.g. operating with at least one fuzzy rule, e.g. in the form of membership functions. The membership functions may e.g. be formulated as: measured value indicates low probability of event 34, measured value indicates medium probability of event 35, and measured value indicates high probability of event 36 for each weight. Based on the membership functions, each weight is assigned degrees of membership to the membership functions.

The degrees of membership are inputted 37 into a fuzzy rules engine 38 comprising a set of fuzzy rules so as to assign an overall fuzzy label to the event data.

Examples of fuzzy labels may be such as: event data indicates high probability of event, event data indicates medium probability of event and event data indicates low probability of event.

The fuzzy label is inputted 39 into a defuzzy engine 300, which based on the fuzzy label determined an event output 302, such as specific settings to control the parameters, e.g. by setting PI tuning parameters in accordance with the fuzzy labels. For example, if the fuzzy label equal high probability of event, set tuning parameters to the following values, if fuzzy label equal medium probability of event, set tuning parameters to other values, etc.

In an embodiment utilizing neural network, a neural network may be implemented in order to train the event controller, e.g. by training the fuzzy analyzer mention above, to determine the optimal rule. Such neural network may be trained on a large number of cases or it may train itself as the number of event increases.

In an embodiment utilizing statistical analysis, statistical calculations are made, such as mean deviation of values at increasing n, and basing the rules on data with small deviations observed at increasing n.

Figure 4:
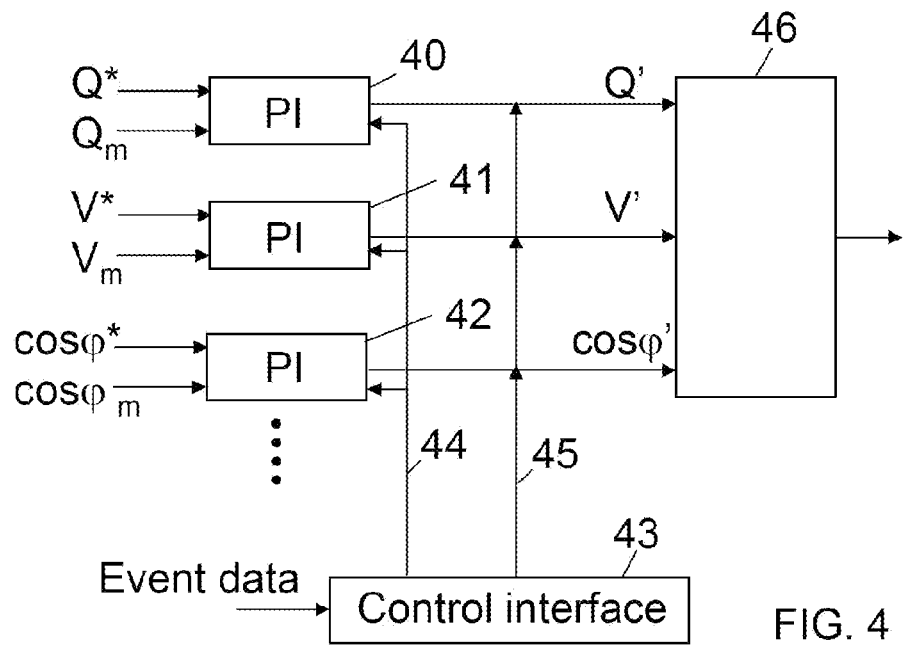
FIG. 4 schematically illustrates an implementation of control elements in the form of PI controllers for controlling a parameter of the event data.

FIG. 4 schematically illustrates an implementation of elements for controlling a parameter of the event data.

In a SCADA system a number of control loops may be present for controlling a number of parameters, in FIG. 4, PI-controllers 40-42 for reactive power, Q, voltage, V, and phase shift, COS φ, are shown. Each PI-controller receives or stores a target value (*-marked values) and the measured values (subscript m). The target values are typically constant values for maintaining an output level or ramp values for ramping up or ramping down an output level. The PI controller outputs an output setting (*-marked values). It is to be understood that even though a PI controller is assumed in FIG. 4, this is purely to simplify the description, P and PID controllers, as well as similar controllers, may be also used.

In an embodiment the parameter is controlled in term of setting 44 the tuning parameters of the PI controllers. In this embodiment, the PI controllers operate normally except that the tuning parameters which are used in their control loop are dictated by the control interface 43.

In an embodiment, instead of or in addition to controlling the PI tuning parameters, the parameter is controlled in term of a correction signal. In this embodiment, the PI controller operates normally, however the output values are modified 45 in accordance with the correction signal dictated by the control interface.

The output signals are inputted into a control module 46 for providing the relevant signals to the wind turbine generator or to the relevant equipment for controlling and operating the wind turbine generators.

FIG. 5 illustrates a flow diagram of embodiments in accordance with the present invention.

Event data is received 50, e.g. by temporally monitoring the data as schematically illustrated in FIG. 2.

The event data is analysed 51 in terms of comparing 52 the event data to at least one event rule which is based on at least one predefined event condition 53 and a set of adaptive event conditions 54.

An event output 52 is provided and if the event output fulfils the criteria set up by the event rule, the parameter is controlled 55 in accordance with the event output.

In embodiments, the adaptive event conditions may be adapted 56 when a predefined event condition has been met.

In an embodiment, the control interface takes into account not just event data from a single wind farm, but also control data from other SCADA systems which are operatively connected to other separate wind farms. That is, the event data comprises control data from a SCADA system of a separate location. The wind farms being separate in geographical location, but coupled to the same power grid. In such systems, power productions in separate geographical locations can influence each other. In such an embodiment, the control interface may be operated to control or stabilize parameters of the coupled wind farms, for example to ensure overall stable power production of the wind farms.

In general, the invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A control system providing a control interface between a power output from one or more wind turbine generators and a power grid, the control system comprising:
   an input unit configured to receive a set of event data, the set of event data comprising one or more parameters of the one or more wind turbine generators, and at least part of the set of event data being received from a Supervisory Control And Data Acquisition (SCADA) system;
   an event analyzer configured to provide an event analysis of the set of event data and an event output based on the event analysis, the event analysis being based on at least one predetermined event rule comprising at least one predefined event condition and a set of adaptive event conditions that are adapted during operation; and
   a control unit configured to control at least one parameter of the set of event data in accordance with the event output, wherein each of the adaptive event conditions of the set of adaptive event conditions is associated with a respective adaptive evaluation weight describing a strength of an association between a value of the one or more parameters of the set of event data and an occurrence of the at least one predefined event condition.

2. The control system of claim 1, wherein the input unit, the event analyzer, and the control unit are at least partly implemented into the Supervisory Control And Data Acquisition (SCADA) system.

3. The control system of claim 1, wherein the set of event data further comprises data selected from the group consisting of data indicative of a current provided to the power grid, data indicative of a voltage provided to the power grid, a parameter indicative of a wind speed present at the one or more wind turbine generators, time data, data indicative of an active power, data indicative of a reactive power, data indicative of a total power, meteorological data, data indicative of a grid frequency, data indicative of at least one phase, data indicative of a status of the power grid, a number of active wind turbine generators, a target level of a parameter, and control data from the Supervisory Control And Data Acquisition (SCADA) system.

4. The control system of claim 1, wherein the at least one predefined event condition is based on a predefined change of a parameter value of a selected parameter of the set of event data.

5. The control system of claim 4, wherein the selected parameter is selected from output voltage per phase, output current per phase, phase angle between grid voltage and current, phase angle displacement between individual phases, and grid frequency.

6. The control system of claim 1, wherein the adaptive event conditions are based on a set of parameter values of a selected set of parameters of the set of event data.

7. The control system of claim 1, wherein the event analysis is initiated when values of the set of event data fulfils the set of adaptive event conditions.

8. The control system of claim 1, wherein, when the at least one predefined event condition is met, evaluation weights of the set of adaptive event conditions are modified in accordance with a modification algorithm.

9. The control system of claim 1, wherein the event output is based on at least one fuzzy rule.

10. The control system of claim 1, wherein the event output is based on a neural network.

11. The control system of claim 1, wherein the event output is based on statistical analysis.

12. The control system of claim 1, wherein the controlling of the at least one parameter of the set of event data is based on setting a tuning parameter of a P controller, a PI controller or a PID controller.

13. The control system of claim 1, wherein the at least one parameter of the set of event data is controlled in terms of a correction signal.

14. The control system of claim 1, wherein the input unit and the control unit are communicatively connected to a Supervisory Control And Data Acquisition (SCADA) system.

15. The control system of claim 1, wherein the event analyzer is configured to predict an occurrence of the at least one predefined event condition or a probability of the occurrence of the at least one predefined event condition.

16. The control system of claim 1, wherein each of the respective adaptive evaluation weights is modified when the at least one predefined event condition is met.

17. A method of controlling a power output from one or more wind turbine generators to a power grid, the one or more wind turbine generators being communicatively connected to a Supervisory Control And Data Acquisition (SCADA) system, the method comprising:
  receiving a set of event data comprising one or more parameters of the one or more wind turbine generators, at least part of the set of event data being received from the SCADA system;
  analyzing the set of event data to provide an event analysis and an event output based on the event analysis, the event analysis being based on at least one predetermined event rule comprising at least one predefined event condition and a set of adaptive event conditions that are adapted during operation; and
  controlling at least one parameter of the set of event data in accordance with the event output,
  wherein each of the adaptive event conditions of the set of adaptive event conditions is associated with a respective adaptive evaluation weight describing a strength of an association between a value of the one or more parameters of the set of event data and an occurrence of the at least one predefined event condition.

18. A Supervisory Control And Data Acquisition (SCADA) system being arranged to operate in accordance with the method of claim 17.

19. A computer program product comprising a set of instructions embodied in a non-transitory storage medium, which when executed by a processor of a computer, causes the computer to perform the method of claim 17.

20. The method of claim 17, wherein each of the respective adaptive evaluation weights is modified when the at least one predefined event condition is met.

* * * * *